Figure 1:
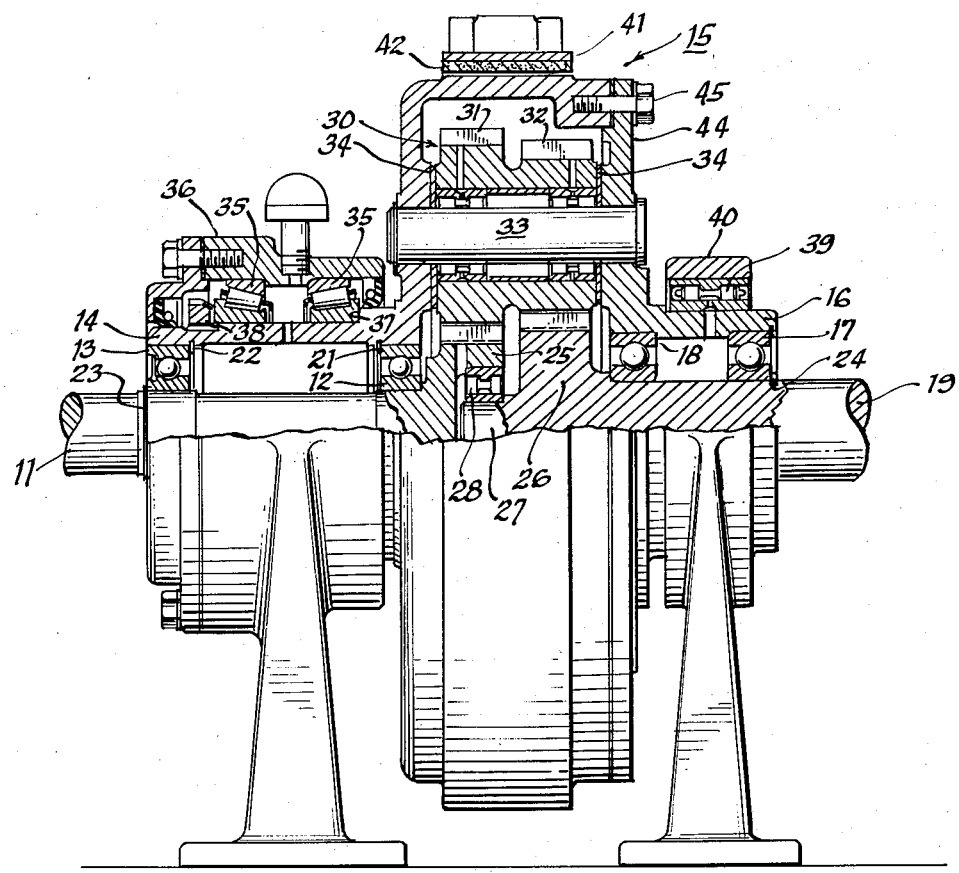

INVENTOR.
Gunnar E. Gunderson and
Hubert Hollmann
BY Fidler, Crouse and
Beardsley
Attorneys

2,901,925
GEAR SYSTEM

Gunnar E. Gunderson, Lemont, and Hubert Hollmann, Riverside, Ill., assignors to Brad Foote Gear Works, Inc., Cicero, Ill., a corporation of Delaware Application November 23, 1956, Serial No. 623,850

3 Claims. (Cl. 74—789)

This invention relates to a gear system and in particular to a gear system in which the flow of power therethrough is readily interruptible. It is an object of the invention to provide improved apparatus of this character.

In accordance with the preferred embodiment of the invention a driven shaft is arranged coaxially with a drive shaft and is driven at a fixed speed ratio with respect thereto when the gear system is in driving condition, and the drive train of the gear system is readily interruptible by operation of a simple control element such that the drive shaft will not transmit power to the driven shaft. The gear system may readily be reconnected by operation of the same control element such that the driven shaft is again driven by the drive shaft. Further in accordance with the preferred embodiment of the invention, the drive shaft and the driven shaft are rotatably supported within the overall construction and need no further support by external bearings to maintain the various operating parts including the drive shaft and the driven shaft in proper alignment. Provision is also made for thermal expansion of various portions of the system with respect to each other in an axial direction.

Accordingly it is another object of the invention to provide an improved interruptible-drive gear system, the various operating parts of which are supported within the overall system.

It is another object of the invention to provide an improved interruptible-drive gear system which permits thermal expansion of various elements thereof with respect to each other in an axial direction.

It is another object of the invention to provide an improved interruptible-drive gear system which may readily be disassembled without separation from an external supporting structure.

It is another object of the invention to provide an improved interruptible-drive gear system which is efficient, convenient, durable, and economical to manufacture.

This invention, together with further objects and advantages thereof, will best be understood by reference to the following description taken in connection with the accompanying drawings, and its scope will be pointed out in the appended claims.

Figure 2:
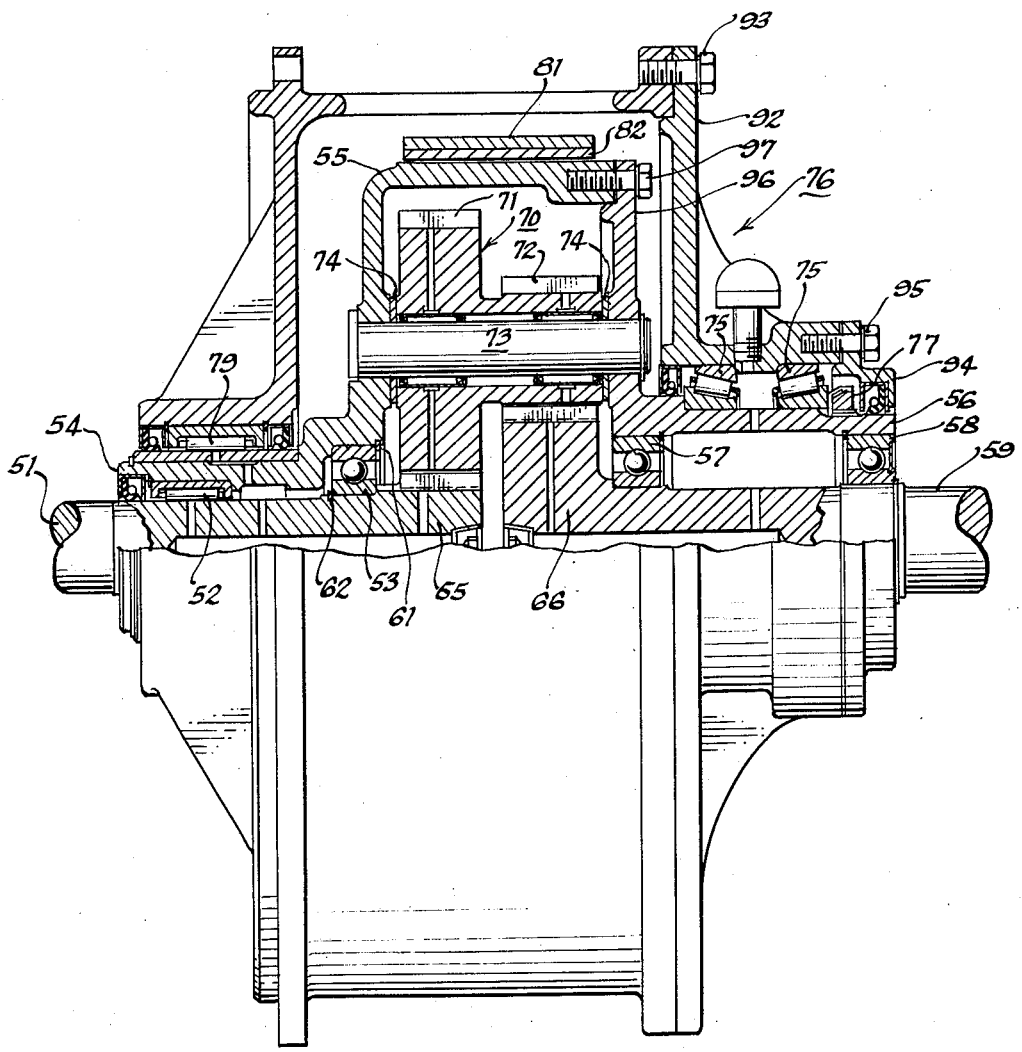

In the drawings, in which like parts are designated by like reference numerals:

Figure 1 is an elevational view, partially in cross section, of a gear system illustrating one embodiment of the invention; and Fig. 2 is a similar view of a second embodiment of the invention.

In the embodiment of the invention shown in Fig. 1, a drive shaft 11 is rotatably supported by two spaced-apart sets of ball bearings 12 and 13. The bearings 12 and 13 are in turn supported by a sleeve-like portion 14 of a housing 15. The same housing has another sleeve-like portion 16 which supports two additional spaced-apart sets of ball bearings 17 and 18. These latter bearings rotatably support a driven shaft 19 such that it is axially aligned with the drive shaft 11. It will therefore be seen that the common housing 15 supports both the drive shaft 11 and the driven shaft 19 for rotation about a common axis without the necessity of any external bearings for supporting these shafts.

The ball bearing 12 is maintained inwardly of the housing by virtue of its bearing against a snap ring 21 set into an annular keyway in the housing 15. Inwardly of this bearing the drive shaft 11 is seen to have a shoulder which bears against the inner edge of the ball bearing construction 12, whereby the drive shaft is locked against movement outwardly of the housing. The ball bearing 13 is maintained against inward movement with respect to the housing by a snap ring 22 set into an annular keyway in the housing, and a snap ring 23 set into an annular keyway in the drive shaft 11 bears against the outer surface of the ball bearing construction 13. In this manner the drive shaft is restrained against inward movement with respect to the housing 15.

The driven shaft 19 is similarly restrained against axial movement with respect to the sleeve-like portion 16 of the housing. The ball bearing 18 is set into a recess therein whereby it is restrained against movement outwardly of the housing. The driven shaft 19 is seen to have a shoulder immediately inwardly of the ball bearing construction 18 such that the shaft is restrained against movement outwardly of the housing. The ball bearing 17 is also set into a recess in the housing such that it may not move inwardly of the housing, and the driven shaft 19 has a snap ring 24 set into an annular keyway therein which bears against the outer side of the ball bearing construction 17. Accordingly the driven shaft 19 is restrained against axial movement either inwardly or outwardly of the housing 15.

Mounted on and preferably integral with the drive shaft 11 is a drive gear 25. Similarly a driven gear 26 is mounted on and is preferably integral with the inner end of the driven shaft 19. As will be seen in Fig. 1 the gear 25 constituting the inner end of the drive shaft 11 is recessed, and receives a reduced diameter axial projection 27 of the driven shaft 19 therein. Arranged between the outer surface of the axial projection 27 of the driven shaft and the inner surface of the recess within the gear 25 are roller bearings 28. The roller bearings support the free inner ends of the two shafts 11 and 19 with respect to each other.

Carried within the housing 15 are a plurality of dual gears 30, preferably three in number, which cooperate with the gears 25 and 26. More specifically, each of the dual gears 30 includes a gear 31 which meshes with the drive gear 25 and a gear 32 which meshes with the driven gear 26. The gears 31 and 32 preferably form an integral construction which is rotatably mounted through roller bearings on a corresponding shaft 33 carried by the housing 15. Each shaft 33 is upset at one end (the right-hand end in Fig. 1) and a flattened portion of the upset end engages a shoulder on the housing 15, as shown, to prevent rotation of the shaft with respect to the housing. The other end of each shaft 33 is held in place by a snap ring set in an annular groove therein.

Washer-like members 34 are preferably arranged between the respective ends of the dual gears 30 and the inner sides of the housing 15, these members serving to maintain the dual gears in proper alignment with the main gears 25 and 26 and being of suitable material, such as bronze, to minimize friction. It will be understood that there are preferably three dual gears 30, a like number of shafts 33 and a like number of pairs of washer-like members 34, and that all three of the dual gears 30 are continuously meshed with the main gears 25 and 26.

The housing 15 is rotatably supported at the power input end by two sets of taper bearings 35 supported in a pillow block 36. It will be understood by those skilled in the art that the two sets of taper bearings 35 permit rotation of the housing 15 within the pillow block 36 and at the same time serve as thrust bearings, whereby the housing 15 may be restrained from axial movement in either direction. The two sets of taper bearings 35 are spaced apart by suitable shoulders on the inner surface of the pillow block 36, and they engage the sleeve portion 14 through a suitable shoulder 37 on the sleeve portion and a nut and lock washer assembly 38, all as shown in Fig. 1.

Roller bearings 39 rotatably support the sleeve-like portion 16 of the housing in a pillow block 40 at the power output end of the apparatus, and permit axial movement of the sleeve-like portion 16 with respect to the pillow block 40. This in turn permits thermal expansion of the housing 15 axially with respect to the pillow blocks with no distorting forces being set up as a result of temperature changes.

It will be understood from the above description that the drive gear 25 meshes with and drives the gear 31 of each dual gear 30. The dual gears are thereby caused to rotate about their shafts 33, and the gears 32 thereof engage and drive the driven gear 26 and the driven shaft 19. However, in order for power to be transmitted through this gear train it is necessary that the shafts 33 and the dual gears 30 be restrained from revolving about the shafts 11 and 19. In order to restrain the housing 15 and hence the shafts 33 from such revolution, a brake band 41, having a brake lining 42, is provided which extends circumferentially around the housing 15 and which may be tightened thereagainst by any suitable manually operated or power operated apparatus. Since the specific apparatus for tightening the brake band 41 does not of itself constitute a feature of the present invention and since it may be of any suitable form well known in the art it is not shown or described in detail herein.

It will now be seen that when the brake band 41 is tightened it restrains the housing 15 against rotation and prevents revolution of the shafts 33 about the shafts 11 and 19. Accordingly a gear train of fixed ratio is established. When the brake band 41 is released the housing 15 is free to rotate. As will readily be understood by those skilled in the art, the gear train is then unable to transmit power from the drive shaft 11 to the driven shaft 19 since motion transmitted to the dual gears 30 will merely cause the shafts 33 and hence the housing 15 to revolve about the shafts 11 and 19, none of the motion being transmitted to the driven shaft 19.

In the particular embodiment disclosed in Fig. 1, there is a 1:1 gear ratio between the drive gear 25 and the gear 31, and there is a 21:27 gear ratio between the gear 32 and the driven gear 26. Accordingly the overall gear ratio from the drive shaft 11 to the drive shaft 19 is 21:27, assuming of course that the housing 15 is held in fixed position by the brake band 41. It is preferred that the two gear ratios be kept substantially equal, as in the present case, and in the same sense whereby the overall gear ratio is at least as great as either of the individual gear ratios.

The housing 15 is readily opened to expose the inner gear parts and to permit disassembly and reassembly of these parts without removing the main portion of the housing from the pillow block 36. To this effect the entire power output end of the housing 15 constitutes a cover 44 which is releasably held to the remaining portion of the housing 15 by screws 45. Upon removal of the screws 45, the snap rings on the shafts 33, and the pillow block 40, the cover 44 may be withdrawn, along with the shafts 33, to expose the gears and permit their removal. It will be noted that this disassembly may be effected without removal of the main portion of the housing from the pillow block 36 and without disconnecting the drive shaft 11 from its drive means.

In the embodiment of the invention illustrated in Fig. 2 many operating parts are similar or identical to those appearing in the embodiment of Fig. 1 and accordingly will be only briefly described. A drive shaft 51 may be seen to be supported by roller bearings 52 and a ball bearing assembly 53, these bearings in turn being supported by a sleeve-like portion 54 of a housing 55. The housing has a second sleeve-like portion 56 at the opposite or power output end of the apparatus, and arranged within the sleeve-like portion 56 are ball bearings 57 and 58 which rotatably support a driven shaft 59.

The drive shaft 51 is locked against axial movement with respect to the housing 55 through the ball bearing 53. A snap ring 61 set in an annular keyway in the housing 55, and a shoulder formed in the housing as shown, prevent the ball bearing 53 from moving axially with respect to the housing. Similarly a snap ring 62 set into an annular recess in the drive shaft 51, and a suitable shoulder 63 formed in the drive shaft as shown prevent axial movement of the drive shaft with respect to the ball bearing 53. By this means the shaft 51 is restrained from moving axially with respect to the housing 55. Similar snap rings and shoulders associated with the ball bearings 57 and 58 restrain the driven shaft 59 against axial movement with respect to the housing 55.

Secured to and preferably integral with the drive shaft 51 is a drive gear 65. Similarly a gear 66 is secured to and is preferably integral with the driven shaft 59. As in the case of the previously described embodiment of the invention a plurality of dual gears 70, preferably three in number, are provided, each of which has a gear 71 meshing with the drive gear 65 and a gear 72 meshing with the driven gear 66. Each of the dual gears 70 is rotatable about a corresponding shaft 73, the power input end of the shafts 73 being upset and having a flattened portion engageable with a shoulder on the housing, and the power output ends having snap rings, all as in the embodiment of Fig. 1. Washer-like members 74 are arranged between the ends of the dual gears 70 and the walls of the housing 55 as in the previously described embodiment.

The housing 55 is rotatably supported at the power output end by taper bearings 75, these bearings being the same as and serving the same function as the bearings 35 of the first described embodiment of the invention. The bearings are in turn supported by a fixed housing 76 and are anchored to this housing 76 and to the sleeve-like portion 56 of the inner housing by suitable shoulders and a nut and lock washer assembly 77 such that the inner housing is axially fixed with respect to the fixed housing 76 at the power output end.

At the power input end of the apparatus the sleeve-like portion 54 is rotatably supported by roller bearings 79 which are in turn supported by the fixed housing 76. It will readily be seen that the roller bearings 79 permit axial movement of the sleeve-like portion 54 of the housing 55 with respect to the fixed housing 76.

As in the case of the first described embodiment of the invention, if the housing 55 is held stationary a positive drive train is established including the drive shaft 51, the drive gear 65, the dual gears 70, the driven gear 66, and the driven shaft 59. However, if the housing 55 is free to rotate about the shafts 51 and 59 such that the dual gears 70 may revolve thereabout, no power can be transmitted from the drive shaft 51 to the driven shaft 59.

A brake band 81 having a brake lining 82 is arranged to bear against the cylindrical outer surface of the housing 55 in order to prevent rotation of the housing. The brake band may be selectively tightened or loosened by power operated or manually operated apparatus of any suitable form. Since the apparatus for controlling the brake band does not of itself constitute a feature of the present invention and since it may be of any suitable form, many of which are well known in the art, it is not shown or described in detail herein.

The outer housing 76 may be secured to any suitable support and, in turn, supports all other portions of the apparatus including the brake band and associated operating apparatus without the necessity of any other supporting means.

The outer housing 76 may be readily disassembled to permit access to the apparatus within. To this purpose the outer housing 76 is provided with a cover 92 which is secured to the remainder of the housing as by screws 93. The cover 92 is provided with an end plate or hub 94 secured thereto by screws 95. It will be seen that if the screws 95 are removed the end plate or hub 94 may also be removed, providing access to the bearing retaining nut 77. The bearing retaining nut may then be removed following which the screws 93 may be removed to permit removal of the entire cover 92.

Removal of the cover 92 provides access to the inner housing 55 which also includes a cover 96 secured to the remaining portions of the inner housing 55 by screws 97. Removal of the screws 97 and of various snap rings permits removal of the cover 96 whereby the innermost portions of the gear apparatus are accessible and removable.

Operation of the embodiment of the invention shown in Fig. 2 is essentially the same as that of the first described embodiment. In this instance, however, the ratio of the gears 65 and 71 is approximately 2.24 and the ratio of the gears 72 and 66 is the same, whereby the overall gear ratio is 5:1. As previously indicated it is desirable that the gear ratios of the two sets of gears be substantially equal and, in the same sense, such that the overall gear ratio is at least as great as either.

In the above description no mention has been made of certain well known detailed construction, common in the type of apparatus shown. For example, oil seals and ports are shown in the drawings but have not been described, since they are well known in the art and do not, of themselves, constitute features of the invention.

It will be apparent that the invention may be varied in its physical embodiment without departing from the spirit of the invention, and it is desired, therefore, that the invention be limited only by the scope of the appended claims.

The invention having thus been described, what is claimed and desired to be secured by Letters Patent is:

1. A gear system comprising a drive shaft, a driven shaft aligned with said drive shaft, a drive gear secured to said drive shaft near the end thereof adjacent said driven shaft, a driven gear secured to said driven shaft adjacent said drive gear, a plurality of dual gears each engaged with both said drive gear and said driven gear, a carrier rotatably supporting said dual gears therein, said carrier having sleeve-like portions extending along said drive shaft and said driven shaft respectively, a pair of axially spaced bearings rotatably supporting said drive shaft in one of said sleeve-like portions of said carrier, a pair of axially spaced bearings rotatably supporting said driven shaft in the other of said sleeve-like portions of said carrier, bearing means rotatably supporting one of said sleeve-like portions of said carrier, second bearing means rotatably supporting the other of said sleeve-like portions of said carrier, one of said bearing means permitting free axial movement of the corresponding sleeve-like portion of said carrier with respect thereto, the other of said bearing means including thrust bearing means preventing axial movement of the corresponding sleeve-like portion of said carrier with respect thereto, said carrier also having an outer, cylindrical braking surface, and brake means releasably engageable with said braking surface of said carrier for selectively preventing rotation of said carrier and orbital movement of said dual gears.

2. A gear system comprising a drive shaft, a driven shaft aligned with said drive shaft, a drive gear secured to said drive shaft near the end thereof adjacent said driven shaft, a driven gear secured to said driven shaft adjacent said drive gear, a plurality of dual gears each engaged with both said drive gear and said driven gear, a generally cylindrical carrier arranged coaxially with said drive shaft and said driven shaft and rotatably supporting said dual gears therein, said carrier including a cupped member formed with a generally cylindrical side wall having an outer braking surface and an end wall having a sleeve-like portion extending centrally therefrom, and a generally flat cover plate detachably secured to and closing said cupped member and having a sleeve-like portion extending centrally therefrom in alignment with the sleeve-like portion of said cupped member, said sleeve-like portion extending along said drive shaft and said driven shaft respectively, a pair of axially spaced bearings rotatably supporting said drive shaft in one of said sleeve-like portions of said carrier, a pair of axially spaced bearings rotatably supporting said driven shaft in the other of said sleeve-like portion of said carrier, bearing means rotatably supporting said sleeve-like portions of said carrier, and brake means releasably engageable with the braking outer cylindrical surface of said cupped member for selectively preventing rotation of said carrier and orbital movement of said dual gears.

3. A gear system comprising a drive shaft, a driven shaft aligned with said drive shaft, a drive gear secured to said drive shaft near the end thereof adjacent said driven shaft, a driven gear secured to said driven shaft adjacent said drive gear, a plurality of dual gears each engaged with both said drive gear and said driven gear, a carrier rotatably supporting said dual gears therein, said carrier having sleeve-like portions extending along said drive shaft and said driven shaft respectively, a pair of axially spaced bearings rotatably supporting said drive shaft in one of said sleeve-like portions of said carrier, a pair of axially spaced bearings rotatably supporting said driven shaft in the other of said sleeve-like portions of said carrier, roller bearing means rotatably supporting one of said sleeve-like portions of said carrier for free axial movement therein, thrust bearing means rotatably supporting the other of said sleeve-like portions of said carrier, and restraining axial movement thereof, said carrier also having an outer, cylindrical braking surface, and brake means releasably engageable with said braking surface of said carrier for selectively preventing rotation of said carrier and orbital movement of said dual gears.

References Cited in the file of this patent

UNITED STATES PATENTS

| | | |
|---|---|---|
| 1,541,168 | Nambotin | June 9, 1925 |
| 2,077,387 | Banker | Apr. 20, 1937 |
| 2,263,159 | Berger | Nov. 18, 1941 |
| 2,322,394 | Sharpe | June 22, 1943 |
| 2,479,445 | Wilms | Aug. 16, 1949 |
| 2,528,314 | Langdon | Oct. 31, 1950 |

FOREIGN PATENTS

| | | |
|---|---|---|
| 700,247 | France | Dec. 22, 1930 |
| 986,943 | France | Apr. 11, 1951 |